Figure 1:
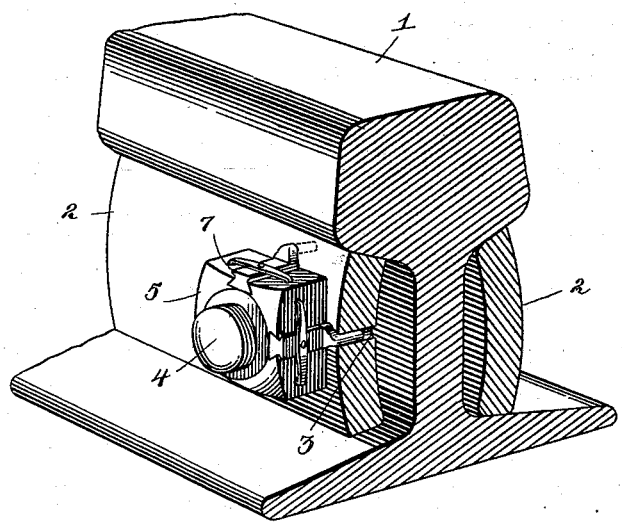

No. 647,806. Patented Apr. 17, 1900.
G. W. CLEVELAND.
NUT LOCK.
(Application filed Aug. 19, 1899.)
(No Model.)

Witnesses
J. P. Britt
Chas. E. Brock

Inventor
G. W. Cleveland.
by
Attorneys

THE NORRIS PETERS CO., PHOTO-LITHO., WASHINGTON, D. C.

UNITED STATES PATENT OFFICE.

GEORGE W. CLEVELAND, OF LITTLE ROCK, WASHINGTON.

NUT-LOCK.

SPECIFICATION forming part of Letters Patent No. 647,806, dated April 17, 1900.

Application filed August 19, 1899. Serial No. 727,770. (No model.)

*To all whom it may concern:*

Be it known that I, GEORGE W. CLEVELAND, a citizen of the United States, residing at Little Rock, in the county of Thurston, in the State of Washington, have invented a new and useful Nut-Lock, of which the following is a specification.

This invention relates to nut-locks; and it consists of a nut having a dovetailed recess, a member adapted to slide in the dovetailed recess and provided with an offset having a depending locking-pin, said member being provided with a spring extending beyond its sides, the extreme ends of said spring being bent at right angles to engage small openings in said nuts.

The object of my invention is to produce a cheap, simple, yet effective nut-lock adapted to all kinds of work; and with this object in view my invention consists of the parts and combination of parts, as will be more fully hereinafter set out in the drawings which accompany and form a part of this specification.

Figure 2:
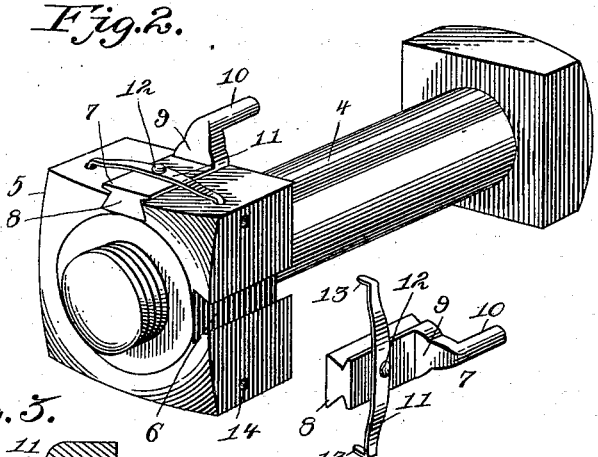
Figure 3:
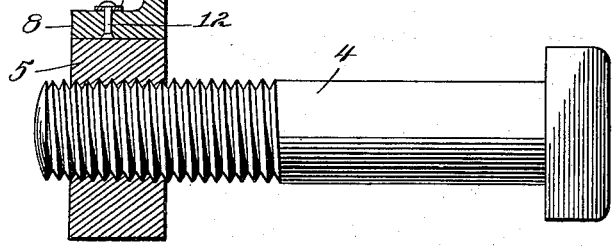
Figure 4:
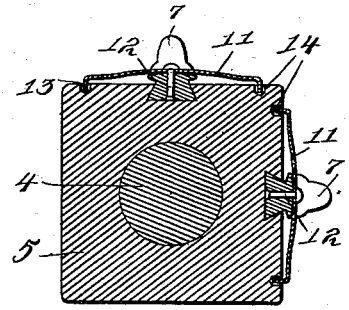

Figure 1 is a perspective view of the lock applied. Fig. 2 is a perspective view of a bolt detached with my invention. Fig. 3 is a side elevation of the same, the nut and lock being in section. Fig. 4 is a central horizontal section of the same through the nut.

1 represents a rail of approved construction.

2 represents fish-plates, one of which is shown as provided with a hole or opening 3 extending through the same.

4 is a bolt of the usual construction.

5 is a nut having interior threads adapted to engage with the threads upon the bolt. The nut 5 is provided in two of its sides with the dovetailed recesses 6, of suitable depth and width. It is obvious that I may provide the nut with more than two of these recesses; but I have found that two are sufficient for all practical purposes.

7 is the locking member, from which depends a dovetailed portion 8, adapted to fit the recess 6 very snugly.

9 is a lateral extension integral with the locking member, from which extends the locking-pin 10, adapted to engage the opening 3 in the fish-plate.

11 is a flat spring secured crosswise to the locking member 7 by means of the pin or rivet 12, the ends 13 of the spring being turned downward at right angles to the main body of the spring, said ends 13 adapted for engagement with the sockets or recesses 14.

To assemble the parts, the bolt is passed through the fish-plates and rail and the nut screwed tightly upon the bolt until the recesses 6 are opposite the opening 3 in the fish-plate. The locking member 7 is then driven in the recess 6 until the pin 10 is driven entirely within the hole 3 in the fish-plate, when the lateral extension 9 is flush with the face of the fish-plate and the outer end of the member 7 is flush with the face of the nut. As soon as the locking member is thus driven in the ends 13 of the spring 11 snap into the recesses 14, thereby holding the locking member firmly against movement incident to the shocks and jars that a bolt and nut on a railroad are subjected to.

When it is desired to remove the nut, the ends 13 of the spring are disengaged from their locking-recesses 14, whereupon the locking member may be withdrawn and the nut removed.

Having thus fully described my invention, what I claim as new, and desire to secure by Letters Patent of the United States, is—

1. The combination with a nut, a recess formed in the sides of the same, of a locking member fitted in said recess, depressions in the sides of the nut, and a flat spring bent at right angles at its ends, said spring being secured to the locking member and the right-angle ends adapted to engage the depressions in the nut to lock the said member against movement.

2. The combination with a nut, a dovetail recess formed in two sides of the same, and depressions on each side of the said recesses, a locking member comprising a dovetail body, a lateral extension integral with the same, a locking-pin extending from said lateral extension, and a flat spring having right-angle ends secured near the top of the same.

3. In a nut-lock, the combination with the fish-plates, holes or openings formed in the same beside the usual bolt-hole, of a bolt, a nut, dovetail recesses in two sides of said nut, depressions on each side of the said recesses, a dovetail locking member comprising a dovetail body having a lateral integral extension, a locking-pin depending from said extension and a flat spring with its ends turned at right angles, all combined and operating, substantially as described.

GEORGE W. CLEVELAND.

Witnesses:
G. C. ISRAEL,
JAS. MCD. ISRAEL.